(12) United States Patent
Tsou et al.

(10) Patent No.: US 10,797,591 B2
(45) Date of Patent: Oct. 6, 2020

(54) POWER CONTROLLERS WITH FREQUENCY JITTERING, AND CONTROL METHODS THEREOF

(71) Applicant: Leadtrend Technology Corporation, Zhubei, Hsinchu County (TW)

(72) Inventors: Ming Chang Tsou, Zhubei (TW); Meng Jen Tsai, Zhubei (TW)

(73) Assignee: LEADTREND TECHNOLOGY CORPORATION, Zhubei, Hsinchu County (TW)

(*) Notice: Subject to any disclaimer, the term of this patent is extended or adjusted under 35 U.S.C. 154(b) by 0 days.

(21) Appl. No.: 16/674,183

(22) Filed: Nov. 5, 2019

(65) Prior Publication Data

US 2020/0195132 A1    Jun. 18, 2020

(30) Foreign Application Priority Data

Dec. 14, 2018  (TW) .............................. 107145229 A (51) Int. Cl.
*H02M 1/44*  (2007.01)
*H02M 3/335*  (2006.01)
*H02M 1/08*  (2006.01)
*H02M 1/00*  (2006.01)

(52) U.S. Cl.
CPC ............. *H02M 1/44* (2013.01); *H02M 1/083* (2013.01); *H02M 3/33515* (2013.01); *H02M 3/33523* (2013.01); *H02M 2001/0009* (2013.01)

(58) Field of Classification Search
CPC .... H02M 1/44; H02M 1/083; H02M 3/33523; H02M 3/33515; H02M 2001/0009; H02M 2001/0058; H02M 2001/0025
See application file for complete search history.

(56) References Cited

U.S. PATENT DOCUMENTS

| | | | |
|---|---|---|---|
| 9,450,478 B1* | 9/2016 | Djenguerian | H02M 3/24 |
| 9,787,191 B2* | 10/2017 | Barrenscheen | H02M 1/4258 |
| 2016/0285361 A1* | 9/2016 | Lin | H02M 3/33507 |
| 2017/0005647 A1* | 1/2017 | Pan | H02M 3/33507 |
| 2017/0250616 A1* | 8/2017 | Takahashi | H02M 3/33576 |

* cited by examiner

*Primary Examiner* — Emily P Pham
(74) *Attorney, Agent, or Firm* — McClure, Qualey & Rodack, LLP (57) ABSTRACT

A power controller disclosed is for the use of a power converter with an inductive to regulate an output power source. The power controller has a PWM signal generator and a jitter inducer. The PWM signal generator controls a power switch to generate consecutive switching cycles. In each switching cycle the PWM signal generator controls a peak to regulate the output power source, and the peak is capable of representing a current flowing through the inductive device. The jitter inducer, connected to the PWM signal generator, is for altering the peak, so as to make a difference between two consecutive peaks. The difference has a sign and a magnitude. The jitter inducer makes the sign changed switching cycle by switching cycle.

19 Claims, 11 Drawing Sheets

POWER CONTROLLERS WITH FREQUENCY JITTERING, AND CONTROL METHODS THEREOF

CROSS-REFERENCE TO RELATED APPLICATION

This application claims priority to and the benefit of Taiwan Application Series Number 107145229 filed on Dec. 14, 2018, which is incorporated by reference in its entirety.

BACKGROUND

The present disclosure relates generally to switch-mode power supplies, and, more particularly, to control methods and apparatuses that jitter the switching frequency of switch-mode power supplies.

Quasi-resonant (QR) mode is a highly efficient mode of operation for power supplies where the turning-on of a power switch is synchronized with the point where the drain-to-source voltage of the power switch is at a local minimum (valley). In other words, QR mode performs valley switching to reduce switching loss and increase power conversion efficiency.

Figure 1:
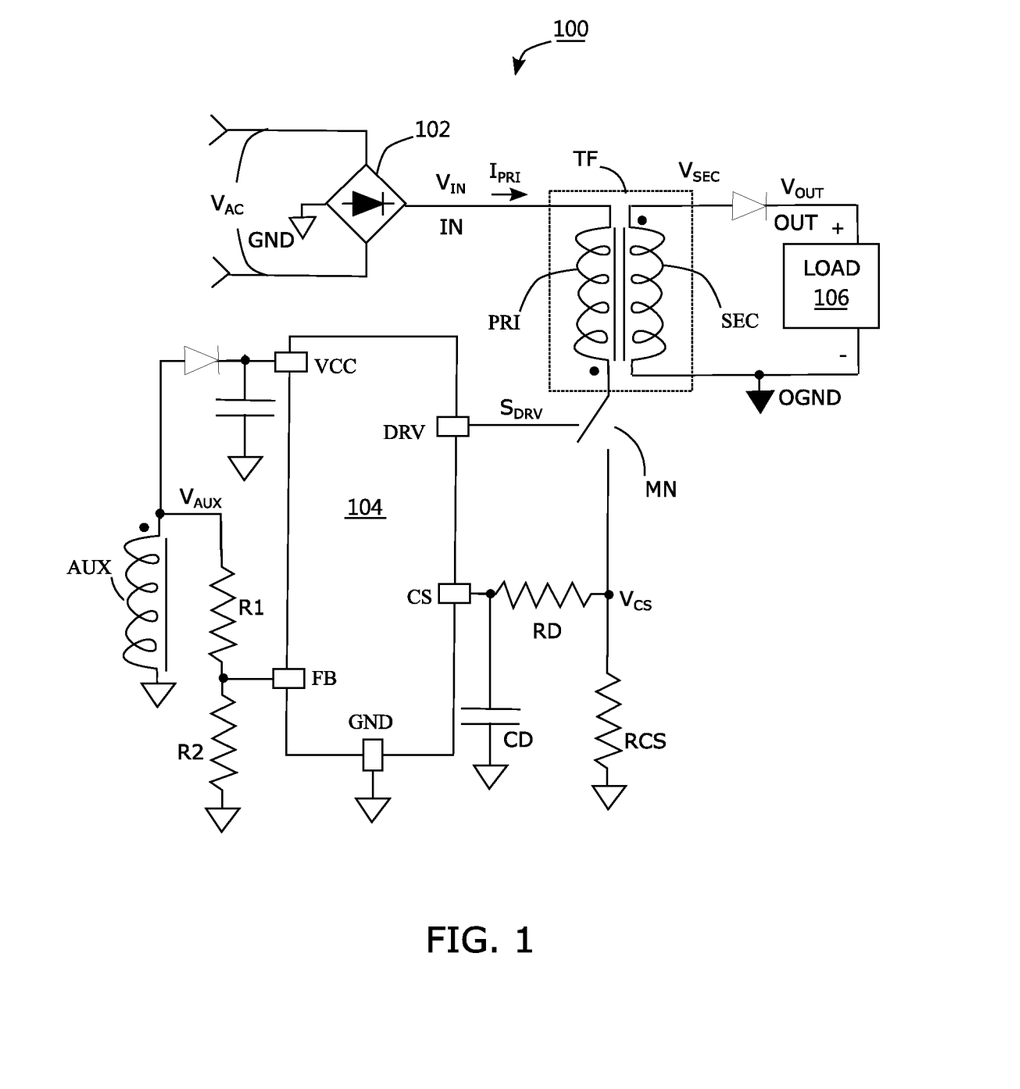
FIG. 1 demonstrates flyback power converter 100 capable of operating in QR mode.

FIG. 1 demonstrates flyback power converter 100 capable of operating in QR mode. Bridge rectifier 102 rectifies alternating-current (AC) voltage VAC to provide input power source $V_{IN}$ at input power line IN and ground voltage at ground power line GND, where the ground voltage is deemed as 0 voltage in a primary side. Transformer TF, an inductive device, has primary winding PRI, secondary winding SEC, and auxiliary winding AUX, inductively coupled to each other. As shown in FIG. 1, transformer TF provides direct-current (DC) isolation to separate a primary side from a secondary side. Primary winding PRI and auxiliary winding AUX, both located at the primary side, are DC connected to ground power line GND and input power line IN. Secondary winding SEC is at the secondary side, configured to provide the electric energy supporting the output power source $V_{OUT}$ at output power line OUT while the voltage at output ground power line OGND is deemed as 0 voltage in the secondary side.

As demonstrated in FIG. 1, primary winding PRI, power switch MN and current-sensing resistor RCS are connected in series between input power line IN and ground power line GND. Resistor RD is connected between current-sensing node CS and current-sensing resistor RCS, and capacitor CD between current-sensing node CS and ground power line GND.

Power controller 104 generates PWM signal $S_{DRV}$ to control power switch MN, actively causing voltage variation across primary winding PRI and inductively alternating voltage $V_{SEC}$ across secondary winding SEC. Rectification of voltage $V_{SEC}$ provides output power source $V_{OUT}$ at output power line OUT and output ground voltage at output ground power line OGND. Output power source $V_{OUT}$ supplies electric energy to load 106. The status of output power source $V_{OUT}$ may be sent, via a photo-coupler (not shown in FIG. 1) or auxiliary winding AUX, to power controller 104 at the primary side, and power controller 104 accordingly determines PWM signal $S_{DRV}$, so as to regulate output power source $V_{OUT}$.

Power controller 104 can perform valley switching by detecting voltage $V_{AUX}$ across auxiliary winding AUX to know the moment when the drain-to-source voltage of power switch MN is about to reach its minimum, achieving QR mode operation.

Figure 2:
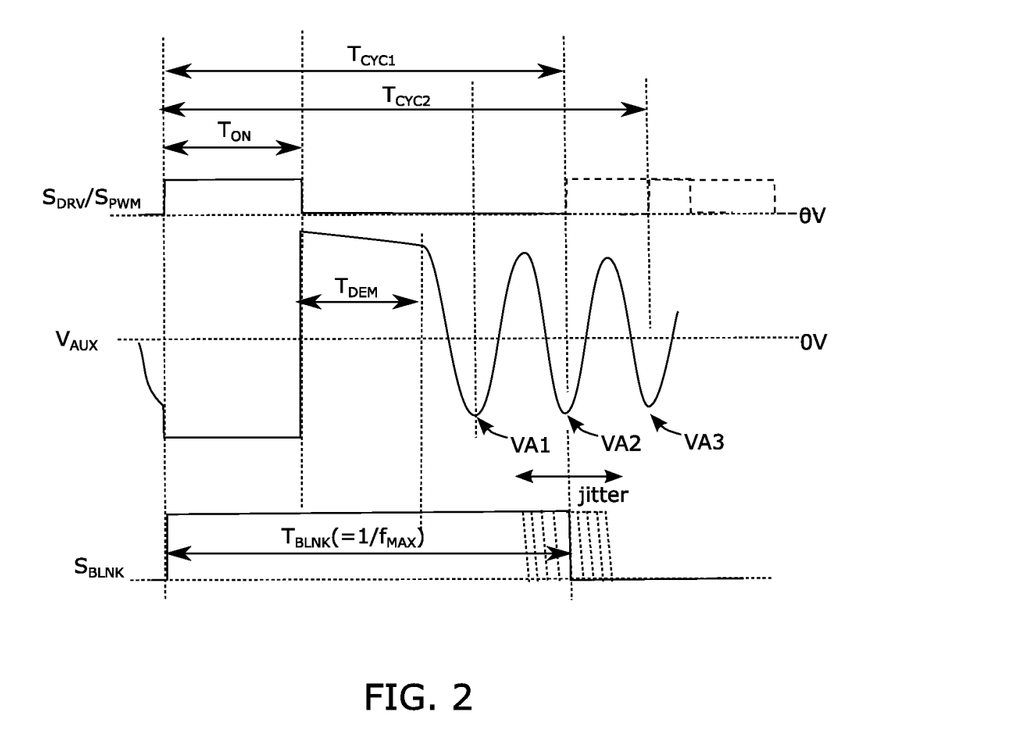
FIG. 2 shows some waveforms of signals in FIG. 1.

FIG. 2 shows some waveforms of signals in FIG. 1. PWM signal $S_{DRV}$ turns on power switch MN during ON time $T_{ON}$, causing current-sensing voltage $V_{CS}$ to increase over time. Energy stored in transformer TF increases over time too. During ON time $T_{ON}$, voltage $V_{AUX}$ is about a constant negative voltage reflecting the voltage of input power source $V_{IN}$. When ON time $T_{ON}$ ends, power switch MN is turned off and transformer TF starts demagnetizing. Demagnetization of transformer TF completes after demagnetization time $T_{DEM}$, then voltage $V_{AUX}$ oscillates to generate signal valleys VA1, VA2, VA3, etc., as shown in FIG. 2, where each signal valley is a local minimum in the waveform of voltage $V_{AUX}$. Power controller 104 could internally count blanking time $T_{BLNK}$ in light of load 106. For example, the lighter load 106 the longer blanking time $T_{BLNK}$. Power controller 104 is configured to start next ON time $T_{ON}$ when the first signal valley appears after the end of blanking time $T_{BLNK}$.

To reduce electromagnetic interference (EMI), switching frequency of power switch MN should preferably spread out in spectrum, and should not stay at around one or several specific frequencies. A conventional way for reducing EMI is slightly, regularly and periodically alter the switching frequency when the load is constant, and this technology is named frequency jitter in the art.

Jitter could be done by power controller 104 slightly altering blanking time $T_{BLNK}$. As exemplified in FIG. 2, small change to blanking time $T_{BLNK}$ makes, nevertheless, ON time $T_{ON}$ start at the moment when signal valley VA2 or VA3 appears. Apparently, the length of a switching cycle under this jitter method is actually about either cycle time $T_{CYC1}$ or cycle time $T_{CYC2}$, implying only two specific frequencies that the switching frequency of power switch MN will stay at in a spectrum. The reduction of EMI might not be good enough.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein:

FIG. 8 demonstrates jitter inducer 204a;

DETAILED DESCRIPTION

Figure 3:
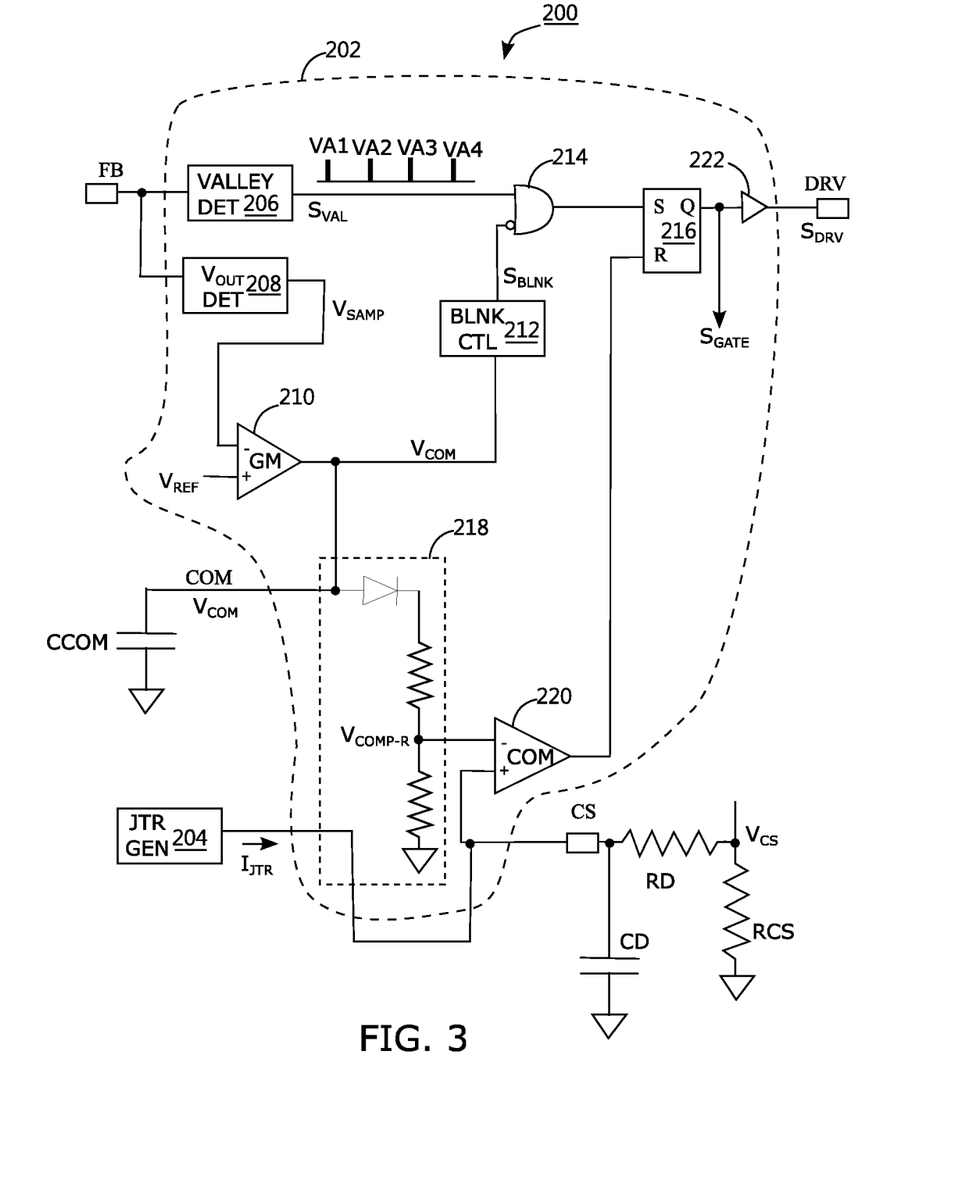
FIG. 3 demonstrates power controller 200, which in embodiments of the invention replaces power controller 104 in FIG. 1.

FIG. 3 demonstrates power controller 200, which in embodiments of the invention replaces power controller 104 in FIG. 1. Power controller 200 includes PWM signal generator 202 and jitter inducer 204.

PWM signal generator 202 drives power switch MN via driving node DRV to generate several consecutive switching cycles, each switching cycle consisting of an ON time and an OFF time. Based on compensation voltage $V_{COM}$ and current-sensing voltage $V_{CS}$, PWM signal generator 202 controls, through the help of attenuator 218 and comparator 220, peak $V_{CS\text{-}PEAK}$ of current-sensing voltage $V_{CS}$, so as to regulate the current or the voltage of output power source $V_{OUT}$.

PWM signal generator 202 has, and is not limited to have, valley detector 206, output detector 208, transconductor 210, blanking-time generator 212, logic gate 214, SR flip-flop 216, driver 222, attenuator 218 and comparator 220.

Valley detector 206 is for indicating the moment when a valley is about to happen. Via feedback node FB, valley detector 206 detects voltage $V_{AUX}$ across auxiliary winding AUX, and sends a pulse to logic gate 214 every time when the waveform of voltage $V_{AUX}$ is about to have a valley. For instance, it could be expected that voltage $V_{AUX}$ is about to have a valley if it drops across 0V. Therefore, valley detector 206 could be configured to send a pulse to logic gate 214 a delay time later after voltage $V_{AUX}$ becomes less than 0V.

Output detector 208 is to detect, via feedback node FB and auxiliary AUX, the voltage of output power source $V_{OUT}$ at the secondary side. For instance, during demagnetization time $T_{DEM}$, voltage $V_{AUX}$ reflects about the voltage of output power source $V_{OUT}$, and could be sampled by output detector 208 to generate voltage sample $V_{SAMP}$. Transconductor 210 compares voltage sample $V_{SAMP}$ with target reference $V_{REF}$ to charge or discharge compensation capacitor CCOM, on which compensation voltage $V_{COM}$ is accordingly built.

Blanking-time generator 212 provides, based on compensation voltage $V_{COM}$, logic gate 214 blanking signal $S_{BLNK}$ that determines blanking time $T_{BLNK}$, before the end of which logic gate 214 blocks any pulse received from valley detector 206. Only if blanking time $T_{BLNK}$ ends, the pulse from valley detector 206 can go through logic gate 214 to set SR flip-flop 216, making gate signal $S_{GATE}$, the output of SR flip-flop 216, 1 in logic. Accordingly, driver 222 provides PWM signal $S_{DRV}$, which has the same logic value with gate signal $S_{GATE}$, to turn on power switch MN and to start ON time $T_{ON}$ in a new switching cycle. Apparently, blanking-time generator 212 makes the cycle time of each switching cycle not less than blanking time $T_{BLNK}$.

ON time $T_{ON}$ could start at the moment that a valley is about to happen as indicated by valley detector 206. Therefore, power controller 200 is a QR controller, making power switch MN to perform valley switching.

During ON time $T_{ON}$, current-sensing voltage $V_{CS}$ increases linearly over time, so does the voltage at the non-inverted input of comparator 220. Attenuator 218 provides compensation voltage $V_{COMP\text{-}R}$, an attenuated version of compensation voltage $V_{COM}$, to the inverted input of comparator 220. When the voltage at the non-inverted input of comparator 220 exceeds that at the inverter input, comparator 220 resets SR flip-flop 216, making gate signal $S_{GATE}$ 0 in logic, so PWM signal $S_{DRV}$, which accordingly becomes 0 in logic, turns off power switch MN to conclude ON time $T_{ON}$ and to start OFF time $T_{OFF}$.

Once OFF time $T_{OFF}$ starts, current-sense voltage $V_{CS}$ quickly drops to 0V as there is no current flowing through power switch MN. Peak $V_{CS\text{-}PEAK}$, a local maximum of current-sensing voltage $V_{CS}$, is accordingly generated, and it also represents a maximum current flowing through primary winding PRI. Therefore, PWM signal generator 202 controls, in response to compensation voltage $V_{COM}$, peak $V_{CS\text{-}PEAK}$ of current-sensing voltage $V_{CS}$ in a switching cycle.

It could be found from FIGS. 1 and 3 that PWM signal generator 202 helps construct a feedback control loop that makes voltage sample $V_{SAMP}$ about equal to target reference $V_{REF}$, and, at the same time, regulates the voltage of output power source $V_{OUT}$ at a value corresponding to target reference $V_{REF}$.

The value of compensation voltage $V_{COM}$ could represent the level of load 106. Generally speaking, the heavier load 106, the higher compensation voltage $V_{COM}$, the shorter blanking time $T_{BLNK}$, and the higher peak $V_{CS\text{-}PEAK}$ of current-sensing voltage $V_{CS}$.

Jitter inducer 204 alters peak $V_{CS\text{-}PEAK}$, so as to make a difference between two consecutive peaks $V_{CS\text{-}PEAK}$ in two consecutive switching cycles respectively. The difference of a switching cycle means peak $V_{CS\text{-}PEAK}$ of the present switching cycle minus peak $V_{CS\text{-}PEAK}$ of the switching cycle just previous to the present switching cycle. The sign of a difference is a plus if the difference is positive, and a minus if the difference is negative. The absolute value of the difference is called a magnitude, always positive. Jitter inducer 204 makes the sign changed switching cycle by switching cycle. In other words, due to the influence from jitter inducer 204, if the difference of a present switching cycle is positive, the difference of the next switching cycle is negative, and the one of the next, next switching cycle is positive, and so on. The sign of the difference alternates between a plus and a minus.

Jitter inducer 204 provides jitter current $I_{JTR}$, which flows through current-sensing node CS, to alter peak $V_{CS\text{-}PEAK}$. If jitter current $I_{JTR}$ is a source current, jitter current $I_{JTR}$ flows out of current-sensing node CS, and through resistor RD, making the voltage at the non-inverted input higher than current-sensing voltage $V_{CS}$. As a result, peak $V_{CS\text{-}PEAK}$ becomes lower if jitter current $I_{JTR}$ is suddenly supplied as a source current, in comparison with that when jitter current is 0 A. In the opposite, peak $V_{CS\text{-}PEAK}$ becomes higher if jitter current $I_{JTR}$ is suddenly supplied as a sink current, that flows into jitter inducer 204.

Figure 4A:
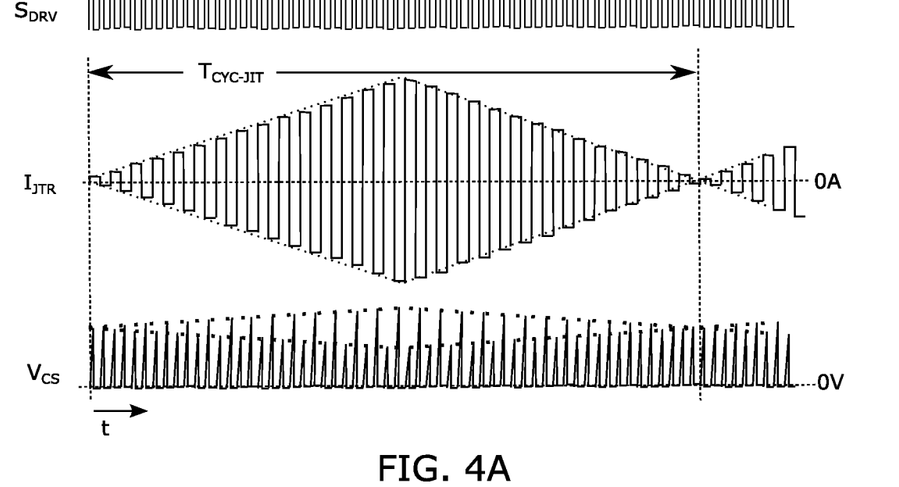
FIG. 4A shows waveforms of PWM signal $S_{DRV}$, jitter current $I_{JTR}$ and current-sensing voltage $V_{CS}$.

FIG. 4A shows waveforms of PWM signal $S_{DRV}$, jitter current $I_{JTR}$ and current-sensing voltage $V_{CS}$. PWM signal $S_{DRV}$ turns on and off power switch MN to generate consecutive switching cycles. Switching cycle by switching cycle, jitter current $I_{JTR}$ alternates between positive and negative. Jitter current $I_{JTR}$ is a source current if it is positive, and a sink current if it is negative. As shown in FIG. 4A, in case that jitter current $I_{JTR}$ is a source current in a switching cycle, it becomes a sink current in the next switching cycle, and will changes back to be a source current in the next, next switching cycle. The magnitude of jitter current $I_{JTR}$ varies regularly with time, and jitter period $T_{CYC\text{-}JTR}$ is the interval between two times when the magnitude of jitter current $I_{JTR}$ is about 0 A.

Figure 4B:
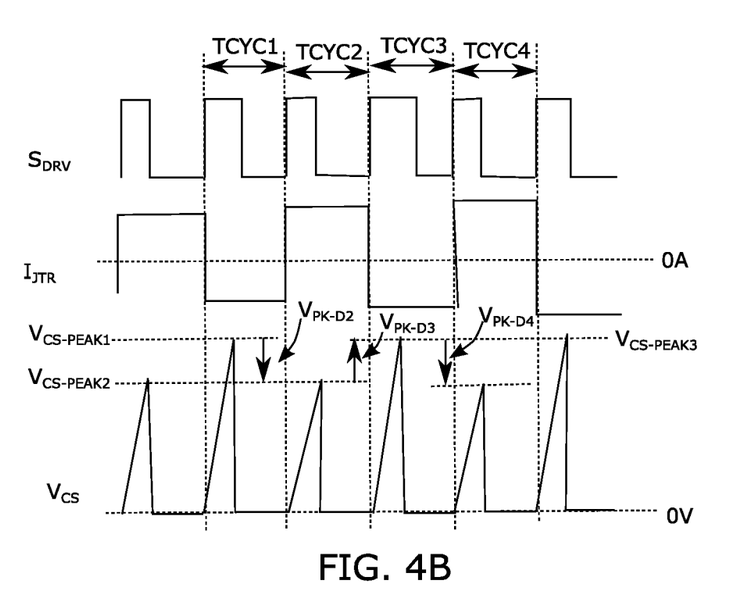
FIG. 4B zooms in the waveforms of signals during four consecutive switching cycles TCYC1, TCYC2, TCYC3, and TCYC4.

FIG. 4B zooms in the waveforms of signals during four consecutive switching cycles TCYC1, TCYC2, TCYC3, and TCYC4.

During switching cycle TCYC1, jitter current $I_{JTR}$ is negative, representing a sink current. Therefore, jitter current $I_{JTR}$ flows from resistor RD, through current-sensing node CS and jitter inducer 204, and to ground power line GND, causing peak $V_{CS\text{-}PEAK1}$ in switching cycle TCYC1.

During switching cycle TCYC2, jitter current $I_{JTR}$ is positive, representing a source current. Therefore, jitter current $I_{JTR}$ flows through current-sensing node CS, resistor RD, and current-sensing resistor $R_{CS}$, and then to ground power line GND, causing peak $V_{CS\text{-}PEAK2}$ in switching cycle TCYC2.

As shown in FIG. 4B, because jitter current $I_{JTR}$ is sink and source currents in switching cycles TCYC1 and TCYC2 respectively, peak $V_{CS\text{-}PEAK2}$ differs from peak $V_{CS\text{-}PEAK1}$ by difference $V_{PK\text{-}D2}$, which is negative as peak $V_{CS\text{-}PEAK2}$ is less than peak $V_{CS\text{-}PEAK1}$. Therefore, the sign of difference $V_{PK\text{-}D2}$ is a minus, while the magnitude of difference $V_{PK\text{-}D2}$ is the absolute value of difference $V_{PK\text{-}D2}$.

Analogous to the aforementioned analysis, it can be derived that the signs of differences $V_{PK\text{-}D3}$ and $V_{PK\text{-}D4}$ are a plus and a minus respectively. The sign of the different between two consecutive switching cycles changes switching cycle by switching cycle, or the sign of the difference alternates between a plus and a minus. It can be also derived from FIG. 4B that jitter current $I_{JTR}$ provided by jitter inducer 204 causes the change of the sign.

Figure 5:
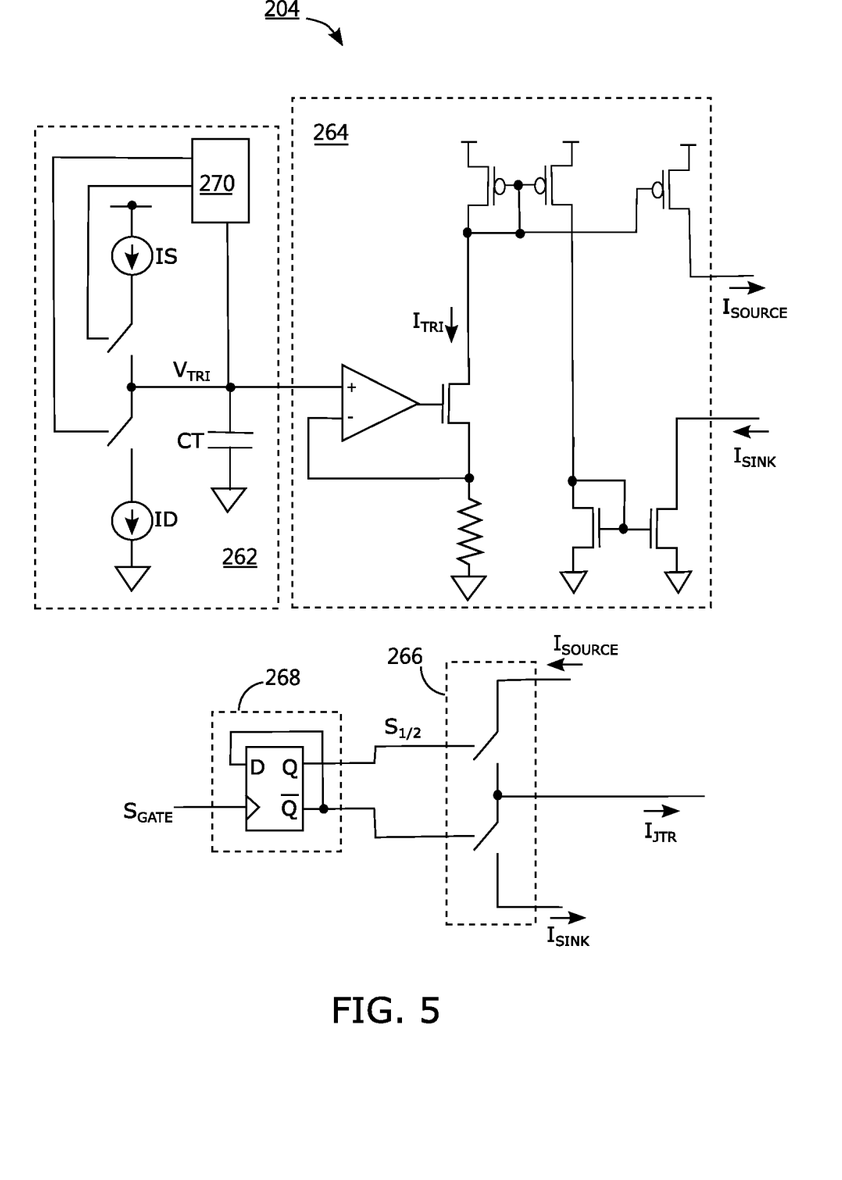
FIG. 5 shows jitter inducer 204.
Figure 6:
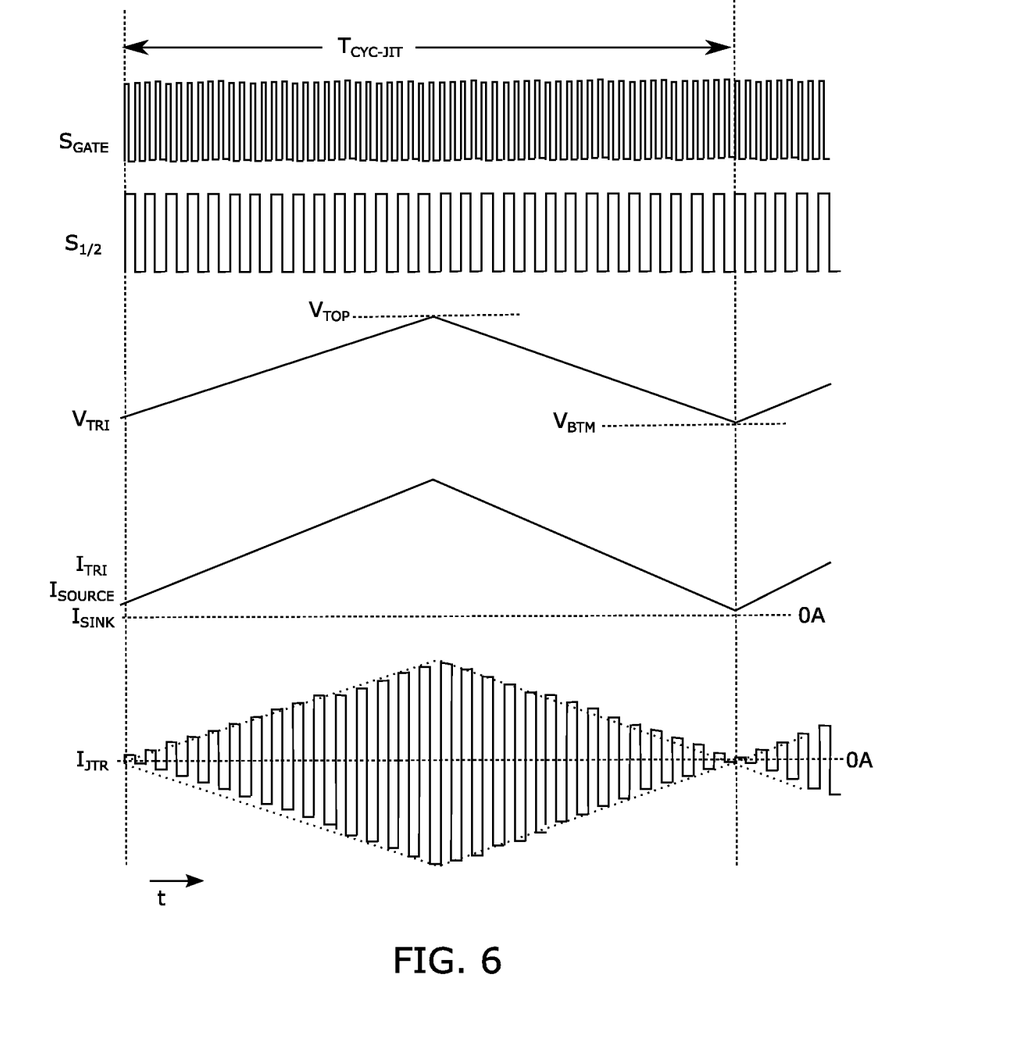
FIG. 6 demonstrates waveforms of signals in jitter inducer 204.

FIG. 5 shows jitter inducer 204, which includes triangular-wave generator 262, voltage-to-current converter 264, divide-by-2 circuit 268 and multiplexer 266. FIG. 6 demonstrates waveforms of signals in jitter inducer 204.

Triangular-wave generator 262 has current source IS for charging, current source ID for discharging, capacitor CT and range controller 270, to generate triangular-wave signal $V_{TRI}$, which varies regularly with jitter period $T_{CYC\text{-}JTR}$. Jitter frequency $f_{CYC\text{-}JIT}$ is the inverse of jitter period $T_{CYC\text{-}JTR}$. As shown in FIG. 6, when triangular-wave signal $V_{TRI}$ exceeds ceiling voltage $V_{TOP}$, range controller 270 stops current source IS charging capacitor CT and makes current source ID discharge capacitor CT. When triangular-wave signal $V_{TRI}$ ramps down below bottom voltage $V_{BTM}$, range controller 270 stops current source ID discharging capacitor CT and makes current source IS charge capacitor CT.

Voltage-to-current converter 264 has several current mirrors, and converts triangular-wave signal $V_{TRI}$ to provide source current $I_{SOURCE}$ and sink current $I_{SINK}$. It is supposed that the magnitudes of source current $I_{SOURCE}$ and sink current $I_{SINK}$ are the same with that of current $I_{TRI}$, which is in proportion to triangular-wave signal $V_{TRI}$.

Divide-by-2 circuit 268, using gate signal $S_{GATE}$ provided by PWM signal generator 202 as a clock signal, generates divide-by-2 clock $S_{1/2}$, whose frequency is about half of the frequency of gate signal $S_{GATE}$.

Multiplexer 266, in response to divide-by-2 clock $S_{1/2}$, alternatively selects source current $I_{SOURCE}$ or sink current $I_{SINK}$ to be jitter current $I_{JTR}$, which is used to alter peak $V_{CS\text{-}PEAK}$. If multiplexer 266 selects source current $I_{SOURCE}$ to be jitter current $I_{JTR}$ in a switching cycle, jitter current $I_{JTR}$ is positive in this switching cycle and will become negative in the next switching cycle because multiplexer 266 will select sink current $I_{SINK}$ to be jitter current $I_{JTR}$ in the next switching cycle.

Triangular-wave generator 262 generates triangular-wave signal $V_{TRI}$ to alter the magnitude of jitter current $I_{JTR}$ regularly over time while the sign of jitter current $I_{JTR}$, as shown in FIG. 6, changes switching cycle by switching cycle.

Frequency jitter could become relatively significant if the sign of jitter current $I_{JTR}$ changes switching cycle by switching cycle. The feedback control loop that PWM signal generator 202 provides to regulate output power source $V_{OUT}$ supposedly maintains peak $V_{CS\text{-}PEAK}$ as a constant value, $V_{EXP}$, if load 106 remains unchanged. In case that jitter current $I_{JTR}$ renders the change of peak $V_{CS\text{-}PEAK}$ in one switching cycle, making it differ from the constant value $V_{EXP}$, then, due to the feedback control loop, peak $V_{CS\text{-}PEAK}$ in the next switching cycle should become closer to the constant value $V_{EXP}$ if jitter current $I_{JTR}$ remains the same in the next switching cycle. If both jitter current $I_{JTR}$ and load 106 remain unchanged all the time, peak $V_{CS\text{-}PEAK}$ eventually will be $V_{EXP}$, as if jitter current $I_{JTR}$ does not exist. In other words, the feedback control loop will automatically dampen the jitter effect for which jitter current $I_{JTR}$ is introduced. One embodiment of the invention makes the sign of jitter current $I_{JTR}$ change switching cycle by switching cycle, so as to keep peak $V_{CS\text{-}PEAK}$ in the next switching cycle away from its stable condition rendered by the feedback control loop, and to maintain the jitter effect for which jitter current $I_{JTR}$ is introduced.

In FIG. 3, jitter current $I_{JTR}$ affects peak $V_{CS\text{-}PEAK}$ by feeding it to current-sensing node CS or the non-inverted input of comparator 220, but the invention is not limited to however. Another embodiment of the invention feeds jitter current $I_{JTR}$ to the inverted input of comparator 220, for example, so it goes through attenuator 218, and peak $V_{CS\text{-}PEAK}$ is accordingly affected. In other words, jitter current $I_{JTR}$ is used to affect current-sensing voltage $V_{CS}$ or compensation voltage $V_{COMP\text{-}R}$ received by comparator 220.

The aforementioned flyback power converter with QR mode operation is only an embodiment, and this invention is not limited to. The embodiments of the invention could include buck converter, booster, or buck-boost converter.

Figure 7:
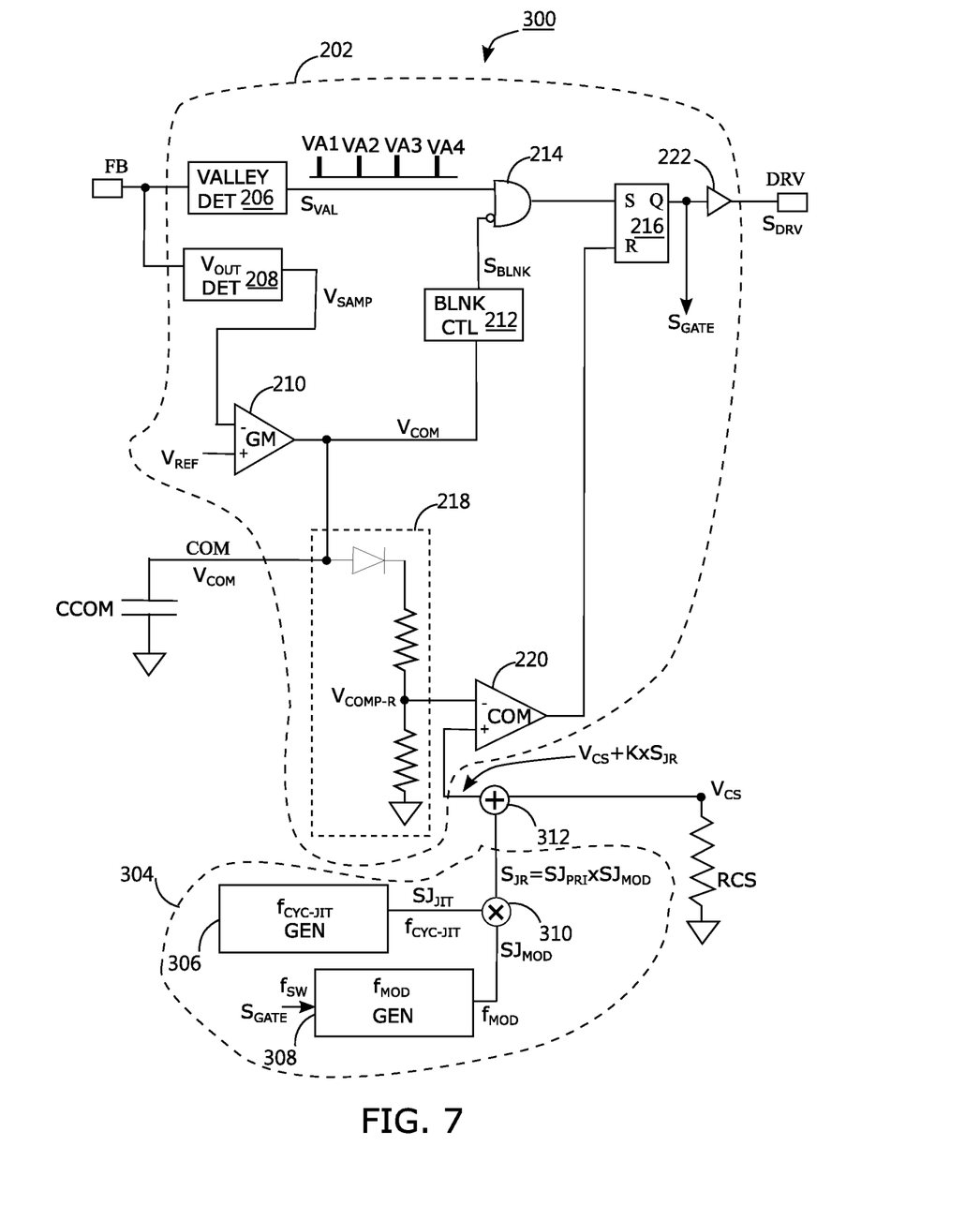
FIG. 7 demonstrates power controller 300 according to embodiments of the invention.

FIG. 7 demonstrates power controller 300 according to embodiments of the invention, where common or similar symbols and devices in FIGS. 7 and 3 are not detailed herein in view of brevity. In embodiments of the invention, power controller 300 replaces power controller 104 in FIG. 1. Power controller 300 includes PWM signal generator 202 and jitter inducer 304, and is capable of rendering frequency jitter to reduce EMI.

In response to compensation voltage $V_{COM}$ and current-sensing voltage $V_{CS}$, PWM signal generator 202 provides PWM signal $S_{DRV}$ to control, for example, power switch MN in FIG. 1 and render power switch MN switched on and off to have switching frequency $f_{SW}$, the inverse of cycle time $T_{SW}$. As detailed before, compensation voltage $V_{COM}$ is charged or discharged by transconductor 210, which receives from output detector 208 voltage sample $V_{SAMP}$, a representative of the voltage of output power source $V_{OUT}$. Compensation voltage $V_{COM}$ accordingly is controlled by output power source $V_{OUT}$. When power switch MN is turned on, current-sensing voltage $V_{CS}$ is capable of representing inductor current $I_{PRI}$ flowing through primary winding PRI.

Jitter inducer 304 provides jitter signal $S_{JR}$, which adjusts current-sensing voltage $V_{CS}$ via adder 312. As shown in FIG. 7, adder 312 provides the non-inverted input of comparator 220 the summation of current-sensing voltage $V_{CS}$ and K times jitter signal $S_{JR}$, where K is a constant. Jitter signal $S_{JR}$ could slightly change switching frequency $f_{SW}$, so as to reduce the EMI from a power supply.

Jitter inducer 304 has jitter-frequency generator 306, swap-frequency generator 308 and multiplier 310. Jitter-frequency generator 306 generates jitter-frequency signal $SJ_{JIT}$, which varies regularly to have jitter frequency $f_{CYC-JIT}$. Swap-frequency generator 308 generates swap-frequency signal $SJ_{MOD}$, which varies regularly to have swap frequency $f_{MOD}$. Multiplier 310 shown in FIG. 7 multiplies swap-frequency signal $SJ_{MOD}$ with jitter-frequency signal $SJ_{JIT}$ to generate jitter signal $S_{JR}$. Jitter frequency $f_{CYC-JIT}$ is lower than swap frequency $f_{MOD}$, which is lower than switching frequency $f_{SW}$.

Jitter inducer 304 in FIG. 7 could be embodied by jitter inducer 204 as an example. Jitter-frequency generator 306 in FIG. 7 corresponds to triangular-wave generator 262 in FIG. 5, jitter-frequency signal $SJ_{JIT}$ to triangular-wave signal $V_{TRI}$, swap-frequency generator 308 to divide-by-2 circuit 268, swap-frequency signal $SJ_{MOD}$ to divide-by-2 clock $S_{1/2}$, multiplier 310 to the combination of voltage-to-current converter 264 and multiplexer 266, and jitter signal $S_{JR}$ to jitter current $I_{JTR}$.

As shown in FIG. 6, when divide-by-2 clock $S_{1/2}$ is 1 in logic, jitter current $I_{JTR}$ is equal to $I_{TRI}$, in positive proportion to triangular-wave signal $V_{TRI}$. When divide-by-2 clock $S_{1/2}$ is 0 in logic, jitter current $I_{JTR}$ is equal to in negative proportion to triangular-wave signal $V_{TRI}$. The frequency of divide-by-2 clock $S_{1/2}$ is half of switching frequency $f_{SW}$, which is equal to the frequency of gate signal $S_{GATE}$. Therefore, switching frequency $f_{SW}$ is larger than the frequency of divide-by-2 clock $S_{1/2}$, which is larger than jitter frequency $f_{CYC-JIT}$, the inverse of jitter period $T_{CYC-JIT}$.

Adder 312 in FIG. 7 corresponds to resister RD connected between comparator 220 and current-sensing resistor RCS in FIG. 3.

Jitter inducer 304 in FIG. 7 is merely an embodiment of the invention, and is not used to limit the invention. In another embodiment, frequency jitter can be achieved by relocating adder 312 in FIG. 7 to the position between the inverted input of comparator 220 and attenuator 218, so that adder 312 uses jitter signal $S_{JR}$ to adjust compensation voltage $V_{COMP-R}$, which is an attenuated version of compensation voltage.

Figure 8:
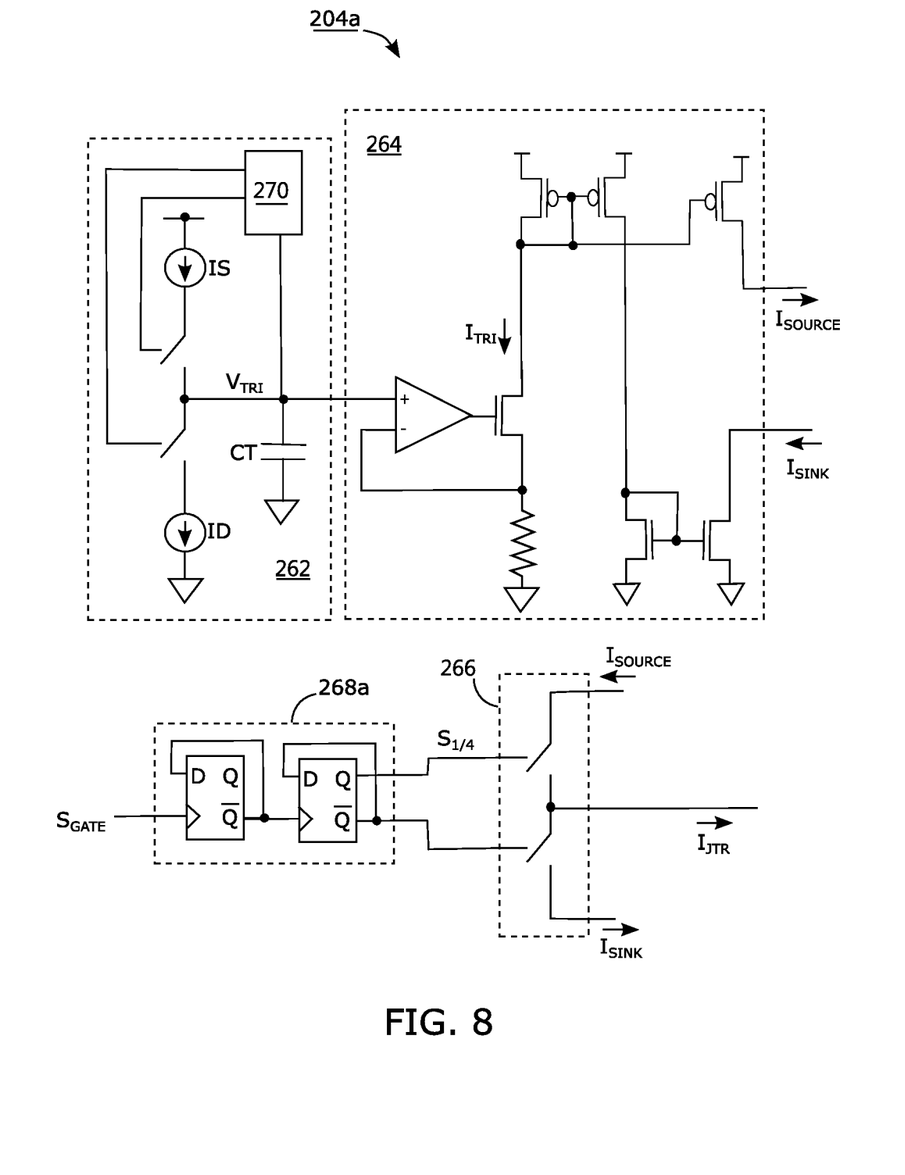

FIG. 8 demonstrates jitter inducer 204a, an embodiment of jitter inducer 304 in FIG. 7. FIGS. 8 and 5 have common or similar symbols and devices, which are comprehensible based on aforementioned teaching regarding to FIG. 5, and are not detailed herein in view of brevity.

Divide-by-4 circuit 268a in FIG. 8, which replaces divide-by-2 circuit 268 in FIG. 5, provides divide-by-4 clock $S_{1/4}$ to control multiplexer 266.

Figure 9:
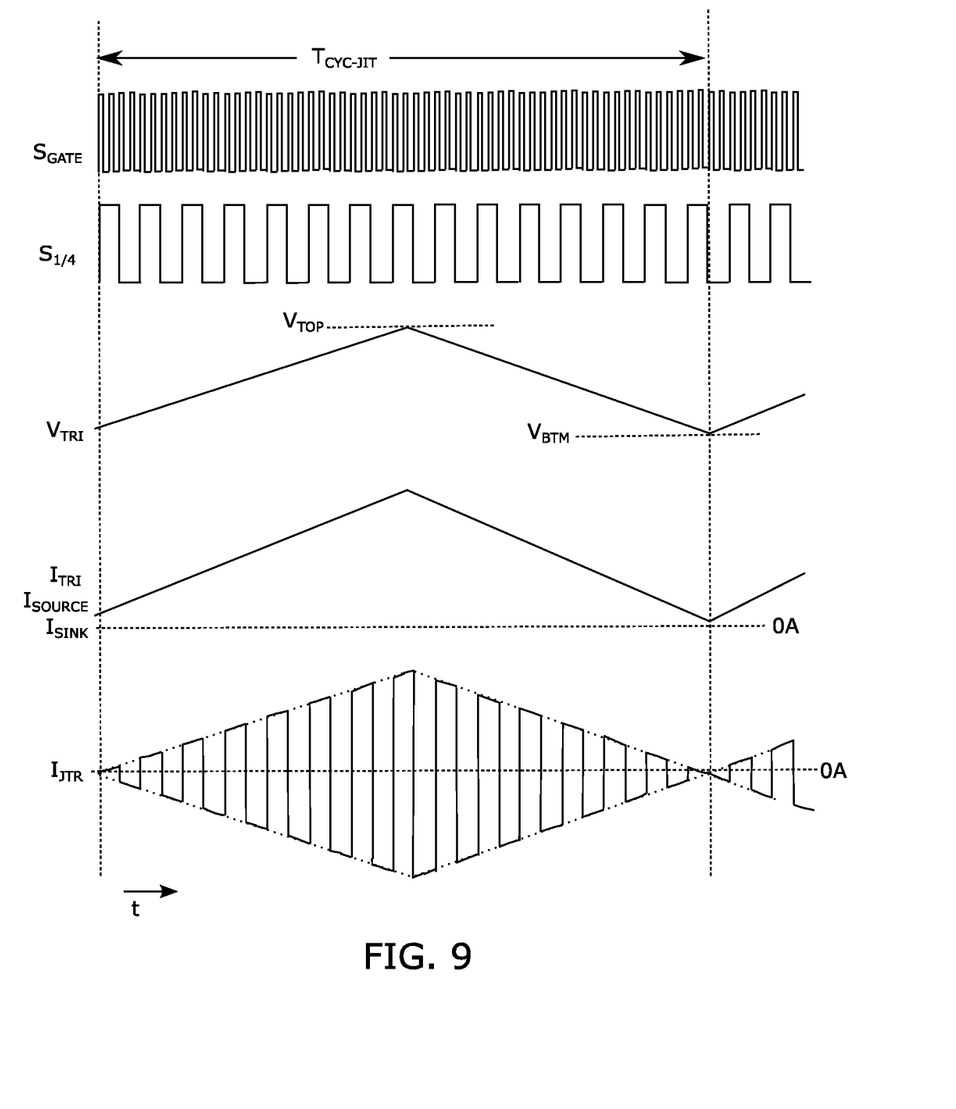
FIG. 9 demonstrates waveforms of some signals in jitter inducer 204a of FIG. 8.

FIG. 9 demonstrates waveforms of some signals in jitter inducer 204a of FIG. 8. When divide-by-4 clock $S_{1/4}$ is 1 in logic, jitter current $I_{JTR}$ is equal to $I_{TRI}$, in positive proportion to triangular-wave signal $V_{TRI}$. When divide-by-4 clock $S_{1/4}$ is 0 in logic, jitter current $I_{JTR}$ is equal to in negative proportion to triangular-wave signal $V_{TRI}$. The frequency of divide-by-4 clock $S_{1/4}$ is a fourth of switching frequency $f_{SW}$, which is equal to the frequency of gate signal $S_{GATE}$. Therefore, switching frequency $f_{SW}$ is larger than the frequency of divide-by-4 clock $S_{1/4}$, which is larger than jitter frequency $f_{CYC-JIT}$, the inverse of jitter period $T_{CYC-JIT}$.

Figure 10:
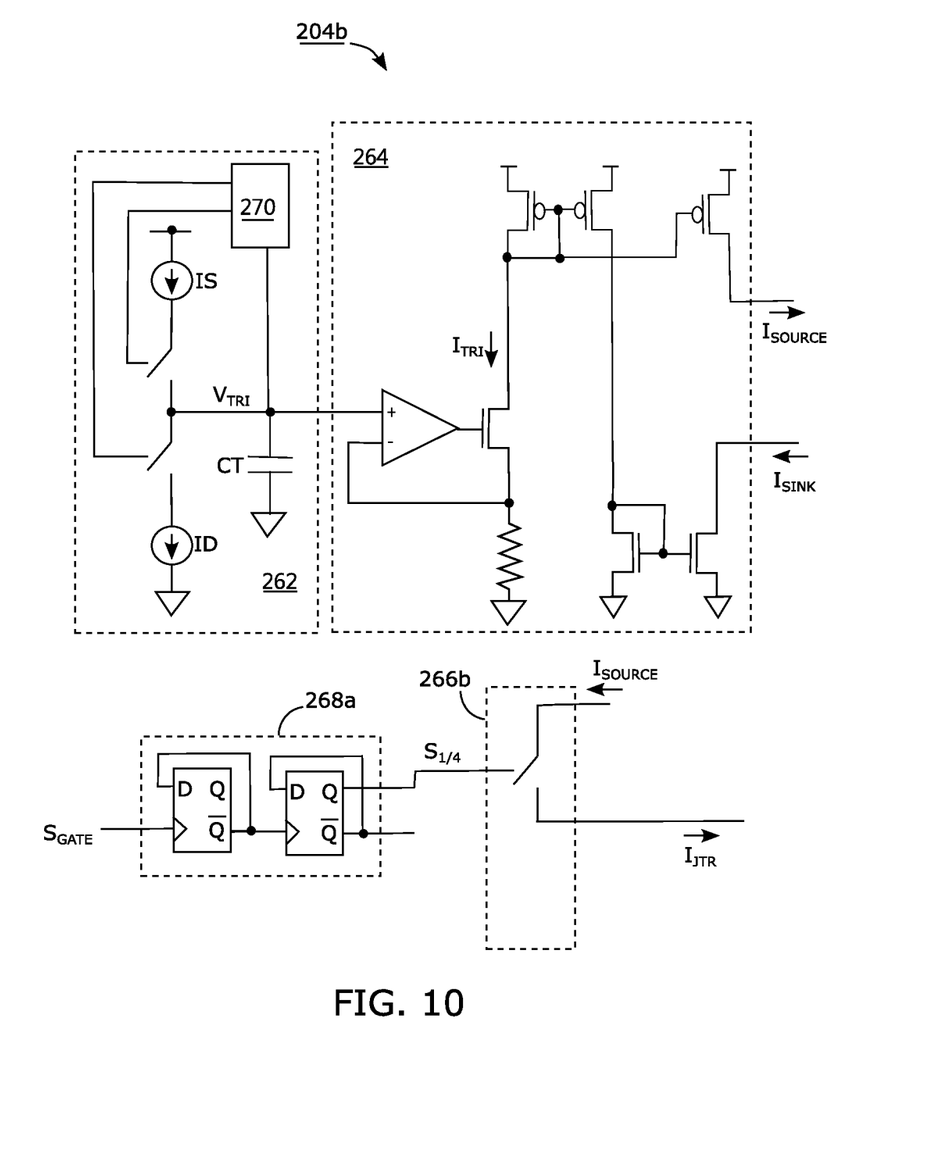
FIG. 10 demonstrates jitter inducer 204*b*.

FIG. 10 demonstrates jitter inducer 204b, another embodiment of jitter inducer 304 in FIG. 7. FIGS. 10 and 8 have common or similar symbols and devices, which are understandable based on aforementioned teaching regarding to FIG. 8, and are not detailed herein in view of brevity.

Multiplexer 266b in FIG. 10, which replaces multiplexer 266 in FIG. 8, has only one switch, which is controlled to pass or block source current $I_{SOURCE}$.

Figure 11:
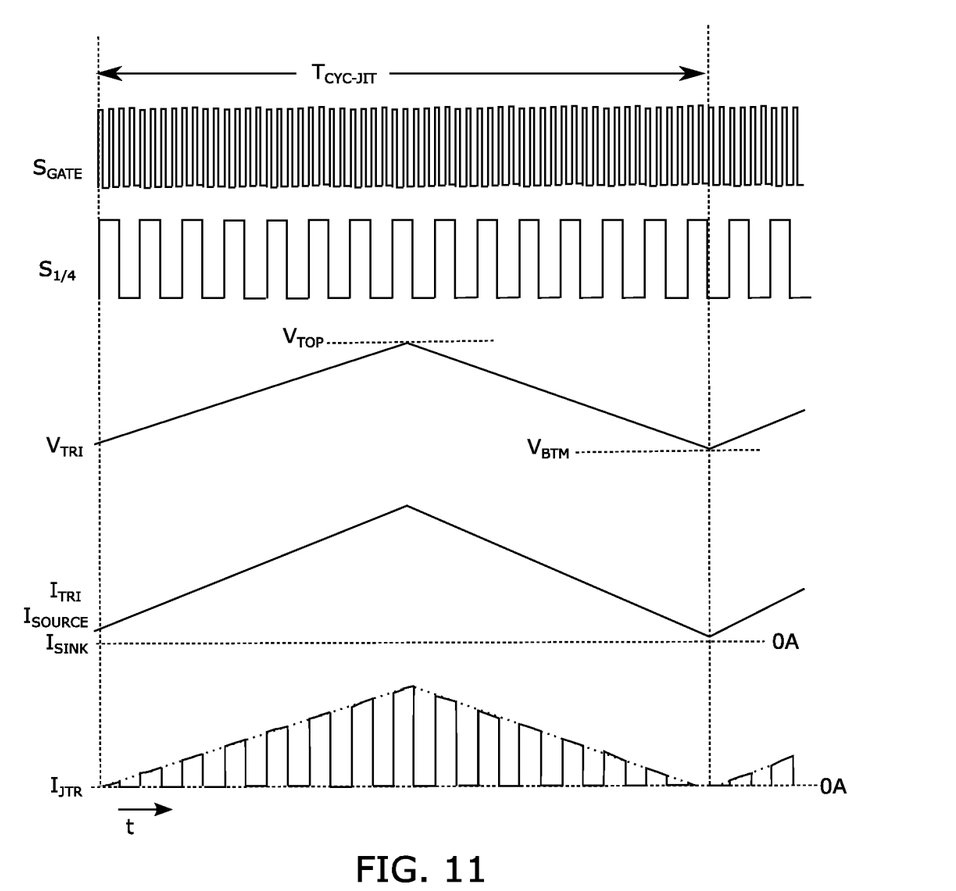
FIG. 11 demonstrates waveforms of some signals in jitter inducer 204*b* of FIG. 10.

FIG. 11 demonstrates waveforms of some signals in jitter inducer 204b of FIG. 10. When divide-by-4 clock $S_{1/4}$ is 1 in logic, jitter current $I_{JTR}$ is equal to $I_{TRI}$, in positive proportion to triangular-wave signal $V_{TRI}$. When divide-by-4 clock $S_{1/4}$ is 0 in logic, jitter current $I_{JTR}$ is 0.

Another embodiment of the invention has jitter current 204 of FIG. 5, but multiplexer 266 in FIG. 5 is replace with multiplexer 266b in FIG. 10. In other words, when divide-by-2 clock $S_{1/2}$ is 1 in logic, jitter current $I_{JTR}$ is equal to $I_{TRI}$, in positive proportion to triangular-wave signal $V_{TRI}$. When divide-by-2 clock $S_{1/2}$ is 0 in logic, jitter current $I_{JTR}$ is 0.

Swap-frequency generator 308 is not limited to divide-by-2 circuit 268 or divide-by-4 circuit 268a, and could be, for example, a frequency divider that provides swap frequency $f_{MOD}$ based on switching frequency $f_{SW}$, which is an integral multiple of swap frequency $f_{MOD}$. In another embodiment of the invention, switching frequency $f_{SW}$ is larger than swap frequency $f_{MOD}$, but is a non-integral multiple of swap frequency.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power controller for use of a power converter with an inductive device, wherein the power converter provides an output power source, the power controller comprising:
    a PWM signal generator controlling a power switch to generate consecutive switching cycles, wherein in each switching cycle the PWM signal generator controls a peak to regulate the output power source, and the peak is capable of representing a current flowing through the inductive device; and
    a jitter inducer connected to the PWM signal generator, for altering the peak, so as to make a difference between two consecutive peaks, wherein the difference has a sign and a magnitude, and the jitter inducer makes the sign changed switching cycle by switching cycle.

2. The power controller as claimed in claim 1, wherein the jitter inducer provides a jitter current to alter the peak, and comprises a triangular-wave generator to alter the jitter current regularly over time.

3. The power controller as claimed in claim 1, wherein the jitter inducer comprises a divide-by-2 circuit to provide a divide-by-2 clock in response to a clock signal from the PWM signal generator.

4. The power controller as claimed in claim 3, wherein the jitter inducer comprises:
    a triangular-wave generator for generating a triangular-wave signal;
    a voltage-to-current converter generating a source current and a sink current in response to the triangular-wave signal; and
    a multiplexer selecting, alternatively in response to the divide-by-2 clock, one of the sink current and the source current, to alter the peak.

5. The power controller as claimed in claim 3, wherein the jitter inducer comprises:
    a triangular-wave generator for generating a triangular-wave signal;
    a voltage-to-current converter generating a source current in response to the triangular-wave signal; and
    a multiplexer, alternatively in response to the divide-by-2 clock, providing the source current to alter the peak, or providing no current.

6. The power controller as claimed in claim 1, wherein the power converter comprises a current-sensing resistor connected between the inductive device and a ground power line to provide a current-sensing voltage, the PWM signal generator controls the power switch in response to the current-sensing voltage and a compensation voltage, and the jitter inducer provides a jitter current to affect the current-sensing voltage or the compensation voltage.

7. The power controller as claimed in claim 1, further comprising a blanking-time generator providing a blanking time in response to a compensation voltage, wherein the power controller is configured to make each of the consecutive switching cycles not less than the blanking time.

8. The power controller as claimed in claim 1, wherein the power controller is a quasi-resonant (QR) flyback PWM controller making the power converter perform valley switching.

9. A control method for use of a power converter providing an output power source, comprising:
controlling a power switch in response to a current-sensing voltage and a compensation voltage, to generate consecutive switching cycles and to regulate the output power source, wherein the current-sensing voltage has a peak in each of the consecutive switching cycles, and the compensation voltage is generated in response to the output power source;
providing a jitter current to alter the peak, so as to make a difference between two consecutive peaks, wherein the difference has a sign and a magnitude; and
changing the jitter current to make the sign changed switching cycle by switching cycle.

10. The control method as claimed in claim 9, comprising:
alternating, switching cycle by switching cycle, a source current and a sink current to be the jitter current.

11. The control method as claimed in claim 9, comprising:
providing a triangular-wave signal; and
regularly changing the jitter current based on the triangular-wave signal.

12. The control method as claimed in claim 9, comprising:
providing the jitter current to affect the current-sensing voltage or the compensation voltage.

13. A power controller for use of a power converter with an inductive device, wherein the power converter provides an output power source, the power controller comprising:
a PWM signal generator controlling a power switch in response to a compensation voltage and a current-sensing voltage, wherein the power switch is controlled to have a switching frequency, the compensation voltage is generated in response to the output power source, and the current-sensing voltage is capable of representing a current flowing through the inductive device; and
a jitter inducer connected to the PWM signal generator, for providing a jitter signal to affect one of the compensation voltage and the current-sensing voltage, the jitter inducer comprising:
a jitter-frequency generator for generating a jitter-frequency signal with a jitter frequency;
a swap-frequency generator for generating a swap-frequency signal with a swap frequency; and
a multiplier multiplying the jitter-frequency signal with the swap-frequency signal to generate the jitter signal;
wherein the switching frequency is higher than the swap frequency, which is higher than the jitter frequency.

14. The power controller as claimed in claim 13, wherein the jitter-frequency signal is a triangular-wave signal.

15. The power controller as claimed in claim 13, wherein the switching frequency is an integer time the swap frequency.

16. The power controller as claimed in claim 13, wherein the jitter signal is in positive proportion to the jitter-frequency signal when the swap-frequency signal is a first logic value, and in negative proportion to the jitter-frequency signal when the swap-frequency signal is a second logic value.

17. The power controller as claimed in claim 13, wherein the jitter signal is in proportion to the jitter-frequency signal when the swap-frequency signal is a first logic value, and zero when the swap-frequency signal is a second logic value.

18. The power controller as claimed in claim 13, further comprising an adder to adjust the current-sensing voltage in response to the jitter signal.

19. The power controller as claimed in claim 13, further comprising an adder to adjust the compensation voltage in response to the jitter signal.

* * * * *